(12) United States Patent
Tian et al.

(10) Patent No.: US 12,381,609 B2
(45) Date of Patent: Aug. 5, 2025

(54) WIRELESS FEDERATED LEARNING FRAMEWORK AND RESOURCE OPTIMIZATION METHOD

(71) Applicant: Beijing University of Posts and Telecommunications, Beijing (CN)

(72) Inventors: Hui Tian, Beijing (CN); Wanli Ni, Beijing (CN); Ping Zhang, Beijing (CN); Shaoshuai Fan, Beijing (CN); Gaofeng Nie, Beijing (CN); Shilin Tao, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 74 days.

(21) Appl. No.: 18/387,068

(22) Filed: Nov. 6, 2023

(65) Prior Publication Data
US 2024/0297700 A1  Sep. 5, 2024

(30) Foreign Application Priority Data
Mar. 1, 2023 (CN) .......................... 202310182495.3

(51) Int. Cl.
*H04L 5/12* (2006.01)
*H04B 7/06* (2006.01)

(52) U.S. Cl.
CPC ......... *H04B 7/0626* (2013.01); *H04B 7/0639* (2013.01)

(58) Field of Classification Search
CPC ........................... H04B 7/0626; H04B 7/0639
USPC .......................... 375/262, 260, 259, 219, 295
See application file for complete search history.

(56) References Cited

U.S. PATENT DOCUMENTS

2021/0312336 A1* 10/2021 Sinn ....................... G06N 3/084
2024/0265311 A1*  8/2024 Ren ......................... G06F 9/50

* cited by examiner

*Primary Examiner* — Zewdu A Kassa
(74) *Attorney, Agent, or Firm* — Bayramoglu Law Offices LLC

(57) ABSTRACT

A wireless federated learning (FL) framework and a resource optimization method are provided to resolve a problem that FL is not suitable for many hardware-constrained Internet of Things (IoT) devices with a small amount of computing resources. In the framework, users with sufficient computing resources upload locally trained model parameters to a base station, and users with limited computing resources only need to send training data to the base station. The base station performs data training and model aggregation to obtain a global model. In this way, the users with limited computing resources and the users with sufficient computing resources cooperatively train the global model. To improve a data transmission rate and reduce an aggregation error of FL, a non-convex optimization problem is constructed to jointly design user transmit power and a reception strategy of the base station, and solves the problem through a successive convex approximation (SCA) method.

17 Claims, 2 Drawing Sheets

WIRELESS FEDERATED LEARNING FRAMEWORK AND RESOURCE OPTIMIZATION METHOD

CROSS REFERENCE TO THE RELATED APPLICATIONS

This application is based upon and claims priority to Chinese Patent Application No. 202310182495.3, filed on Mar. 1, 2023, the entire contents of which are incorporated herein by reference.

TECHNICAL FIELD

The present disclosure relates to the field of wireless resource management and computer technologies, and in particular, to a wireless federated learning (FL) framework and a resource optimization method.

BACKGROUND

A large quantity of Internet of Things (IoT) devices such as low-end sensors, high-definition cameras, and advanced robots are deployed on a network edge such that the next-generation network can support various emerging applications, such as smart factories, autonomous driving, interactive games, and the metaverse. Success of these applications is based on full use of huge amounts of data.

Traditional centralized learning (CL) needs to acquire data samples from edge users. However, a large amount of data is distributed on geographically isolated terminals, which brings huge communication overheads to CL. In addition, considerable transmission delays affect real-time performance of applications. Furthermore, directly sending raw data poses a risk of privacy leakage for individual users.

To address the main challenge of CL, federated learning (FL) allows users to locally update models, thereby avoiding the transmission of raw data. In comparison with CL, a core idea of FL is to replace the data upload with model sharing. This not only plays an important role in protecting user privacy, but also greatly reduces the communication burden.

Success of FL relies on abundant computing resources on IoT terminals. However, this is impractical for many hardware-constrained IoT devices, such as low-end sensors with limited computing resources. Therefore, it is extremely challenging to directly implement existing (centralized or federated) machine learning frameworks in heterogenous IoT devices with different computing capabilities.

To address these challenges, it is necessary to explore a new machine learning framework to ease the computational requirements for these resource-constrained IoT devices. In addition, to improve the data transmission rate and reduce aggregation errors of FL, it is important to propose a new learning and optimization method to make full use of distributed data and computing resources of an FL server and all clients.

SUMMARY

To overcome defects of the prior art, the present disclosure provides a wireless FL framework and a resource optimization method.

To achieve the foregoing objective, the present disclosure provides the following technical solutions:

The present disclosure provides a wireless FL framework, including:

N CL users with limited computing resources, where the CL users send training data to a base station for CL to participate in FL;

K FL users with sufficient computing resources, where the FL, users obtain local models through local training data, and upload local model parameters as an aggregation model to the base station; and the base station serving as an FL server and configured to compute a global model, where the base station performs CL on the training data accumulated by the CL users to obtain a CL model, and performs weighted summation on the CL model and the received aggregation model based on a data amount to obtain the global model.

Further, it is assumed that there are T FL cycles in total, which are represented as a set T={1, 2, . . . , T}. In the $t^{th}$ FL cycle, a local model update formula of the $k^{th}$ FL user is as follows:

$$w_k^{(t+1)} = \tilde{w}^{(t)} - \eta g_k^{(t)}, \; g_k^{(t)} = \nabla F_k(\tilde{w}^{(t)}; D_k^{(t)}), \; \forall k$$

A centralized update formula of the base station is as follows:

$$\overline{w}^{(t+1)} = \tilde{w}^{(t)} - \eta \overline{g}^{(t)},$$

$$\overline{g}^{(t)} = \nabla F(\tilde{w}^{(t)}; D^{(t)})$$

A global model aggregation formula is as follows:

$$\tilde{w}^{(t+1)} = \frac{|D^{(t)}|\overline{w}^{(t+1)} + \sum_{k=N+1}^{N+K} |D_k^{(t)}| w_k^{(t+1)}}{|D^{(t)}| + \sum_{k=N+1}^{N+K} |D_k^{(t)}|}$$

where $\eta$ is a learning rate of a stochastic gradient descent method, $D^{(t)} = \Sigma_{t=1}^{t} \Sigma_{n=1}^{N} D_n^{(t)}$ is a training data set accumulated at the base station in t cycles, $F_k(\cdot)$ and $g_k^{(t)}$ are respectively a local loss function and a gradient of the $k^{th}$ FL user, $F(\cdot)$ and $\overline{g}^{(t)}$ are respectively a loss function and a gradient of the CL at the base station, and $\tilde{w}^{(t+1)}$ is the global model aggregated at the base station.

The present disclosure further provides a resource optimization method for the foregoing wireless FL framework, including the following steps:

S1: initializing, by the base station, a training task and the global model, and sending the global model to all users;

S2: after receiving the global model, computing, by the FL user, a local loss function and a gradient based on the local training data, and updating the local model;

S3: using, by the FL users and the CL users, a same frequency band to respectively upload the local models and send the training data simultaneously; and detecting, by the base station, a received signal through imperfect successive interference cancellation (SIC), and separating the training data and the aggregation model;

S4: obtaining data transmission rates of all CL users and a mean square error (MSE) of the aggregation model of all FL users, and detecting signals of all CL users in an order of 1, 2, . . . , N through imperfect SIC;

S5: constructing a non-convex optimization problem based on the data transmission rates and the MSE of the aggregation model; and S6: transforming and solving the non-convex optimization problem in S5 through a successive convex approximation (SCA) method, and outputting user transmit power and a reception strategy.

Further, the local loss function in S2 is an MSE loss function or a cross-entropy loss function.

Further, S3 specifically includes:

before the user uploads the local model or sends the training data, normalizing a local training data set $\{D_n\}$ of the CL users into a communication symbol set $\{s_n\}$ and the local models $\{w_k\}$ of the FL users into a computation symbol set $\{s_k\}$, where a superimposed signal received by the base station is as follows:

$$y = \underbrace{\sum_{n=1}^{N} h_n \sqrt{p_n} s_n}_{CL\ users} + \underbrace{\sum_{k=N+1}^{N+K} h_k \sqrt{p_k} s_k}_{FL\ users} + \underbrace{n_0}_{Noise}$$

where $h_n(h_k)$ is a channel coefficient from the $n^{th}$ ($k_{th}$) user to the base station, $p_n(p_k)$ is transmit power of the $n^{th}$ ($k^{th}$) user and falls within an interval $[0, P_{max}]$, and $n_0 \sim CN(0, \sigma^2)$ is additive noise in a channel;

adjusting the user transmit power such that SIC constraints of different users satisfy:

$$|h_1 \sqrt{p_1}| \geq |h_2 \sqrt{p_2}| \geq \ldots \geq |h_N \sqrt{p_N}| \geq |h_k \sqrt{p_k}|, \forall k$$

after receiving the superimposed signal y, the signals $\{s_n\}$ of all CL users are detected by the base station in the order of 1, 2, ..., N, where after the signals of all CL users are detected, a residual signal is as follows:

$$\hat{y} = \sqrt{\overline{\omega}} \sum_{n=1}^{N} h_n \sqrt{p_n} s_n + \sum_{k=N+1}^{N+K} h_k \sqrt{p_k} s_k + n_0$$

where $\overline{\omega}$ is an interference coefficient of the residual signal, $\overline{\omega}=0$ corresponds to perfect SIC, and $\overline{\omega}=1$ corresponds to no SIC; and obtaining, by the base station, an estimated value $\hat{s}=a\hat{y}/K$ of the aggregation model from the residual signal $\hat{y}$ by using a receiving factor a, and decoding the signals $\{s_n\}$ and $\hat{s}$ into the training data set of all CL users and the aggregation model through denormalization post-processing, to obtain an average FL model.

Further, in S4, a formula of the data transmission rate of the $n^{th}$ CL user is as follows:

$$R_n = \log_2\left(1 + \frac{|h_n|^2 p_n}{\overline{\omega} \sum_{i=1}^{n-1} |h_i|^2 p_i + \sum_{j=n+1}^{N+K} |h_j|^2 p_j + \sigma^2}\right), \forall n$$

where $\overline{\omega}$ is the interference coefficient of the residual signal, $\overline{\omega}=0$ corresponds to perfect SIC, $\overline{\omega}=1$ corresponds to no SIC, and a sum of the data transmission rates of all CL users is $R_{sum}=\sum_{n=1}^{N} R_n$.

Further, in S4, a formula of the MSE of the aggregation model is as follows:

$$MSE = \frac{1}{K^2}\left(\vartheta_{CL} + \sum_{k=N+1}^{N+K} |ah_k \sqrt{p_k} - 1|^2 + |a|^2 \sigma^2\right)$$

where $$\vartheta_{CL} = \overline{\omega} \sum_{n=1}^{N} |ah_n \sqrt{p_n}|^2$$

is interference of the signals of the CL users.

Further, in S5, the non-convex optimization problem is constructed as follows:

$$\max_{p,a} R_{sum} - \lambda MSE$$

$$s.t.\ R_n \geq R_{min}, \forall n$$

$$p_n, p_k \in [0, P_{max}], \forall n, k$$

$$MSE \leq \dot{o}_0,$$

$$|h_1 \sqrt{p_1}| \geq |h_2 \sqrt{p_2}| \geq \ldots \geq |h_N \sqrt{p_N}| \geq |h_k \sqrt{p_k}|, \forall k$$

where $p=[p_1, p_2, \ldots, p_N, p_{n+1}, \ldots, P_{N+K}]$ is the transmit power, $R_{min}$ is a minimum data transmission rate required by the CL user, $P_{max}$ is maximum transmit power of all users, $\dot{o}_0$ is a maximum aggregation model error that the FL users can tolerate, and $\lambda$ is a constant used to strike a balance between the sum rate $R_{sum}$ and the MSE.

Further, a convex optimization problem obtained through transformation in S6 is as follows:

$$\max_{p,a,\gamma,b} \sum_{n=1}^{N} \log_2(1 + \gamma_n) - \lambda MSE$$

$$s.t.\ h_1^2 p_1 \geq h_2^2 p_2 \geq \ldots h_N^2 p_N \geq h_k^2 p_k, \forall k \in K$$

$$\log_2(1 + \gamma_n) \geq R_{min}, \forall n \in N$$

$$MSE \leq ?_0,$$

$$p_n, p_k \in [0, P_{max}], \forall n, k$$

$$h_n^2 p_n \geq$$

$$\overline{\omega} \sum_{i=1}^{n-1} h_i^2 \left(\frac{\tau_{in}}{2} p_i^2 + \frac{1}{2\tau_{in}} \gamma_n^2\right) + \sum_{j=n+1}^{N+K} h_j^2 \left(\frac{\tau_{jn}}{2} p_j^2 + \frac{1}{2\tau_{jn}} \gamma_n^2\right) + \sigma^2 \gamma_n,$$

$$(a^{(\ell)})^2 + 2a^{(\ell)}(a - a^{(\ell)}) \geq b_i^2 / p_i, \forall i$$

where $\gamma=[\gamma_1, \gamma_2, \ldots, \gamma_N]$ and $b=[b_1, b_2, \ldots, b_N, b_{N+1}, b_{N+2}, \ldots, b_{N+K}]$ are introduced auxiliary vectors, $\gamma_n=2^{R_n}-1, \forall n$, $b_i=a\sqrt{p_i}$, $\forall i \in N \cup K$, and $\tau_{in}$ and $\tau_{jn}$ are convex upper bound (CUB) coefficients.

Further, solving the convex optimization problem in S6 includes:

S6.1: initializing $p^{(0)}$, $a^{(0)}$, $\gamma^{(0)}$, $b^{(0)}$, $\overline{\omega}$, a maximum quantity L of iterations, and a threshold $\varepsilon$, and setting an iteration index $\ell = 0$;

S6.2: computing an objective function value $U^{(\ell)} = R_{sum}^{(\ell)} - \lambda MSE^{(\ell)}$;

S6.3: given $p^{(\ell)}$, $a^{(\ell)}$, $\gamma^{(\ell)}$, and $b^{(\ell)}$, updating $\tau_{in}^{(\ell+1)}$ and $\tau_{jn}^{(\ell+1)}$ by using $\tau_{in}^{(\ell+1)} = \gamma_n^{(\ell)} / p_i^{(\ell)}$ and $\tau_{jn}^{(\ell+1)} = \gamma_n^{(\ell)} / p_j^{(\ell)}$.

S6.4: given $R_{\text{sum}}^{(\ell)}$ and $\tau_m^{(\ell-1)}$, solving the convex optimization problem through a mathematical toolkit CVX to obtain $\mathbf{p}^{(\ell+1)}$, $a^{(\ell-1)}$, $\gamma^{(\ell+1)}$, and $\mathbf{b}^{(\ell+1)}$;

S6.5: computing an objective function value $U^{(\ell+1)} = R_{\text{sum}}^{(\ell+1)} - \lambda \text{MS E}^{(\ell+1)}$;

S6.6: updating $\ell = \ell + 1$ and computing $\Delta_U = |U^{(\ell)} - U^{(\ell-1)}|$; and S6.7: repeating S6.3 to S6.6 until $\Delta_U \leq \varepsilon$ or $\ell \geq L$ and outputting user transmit power $\mathbf{p}^{(\ell-1)}$ and a receiving factor $a^{(\ell-1)}$.

Compared with the prior art, the present disclosure has the following beneficial effects:

(1) The wireless FL framework provided in the present disclosure can allow the users with limited computing resources and the users with sufficient computing resources to participate in FL together, and make full use of data of heterogeneous users to improve performance of a machine learning model.

(2) In the present disclosure, all users use the same frequency band to upload the models or send the data simultaneously such that spectrum resources can be effectively saved and communication delay can be reduced. The base station detects the signals through imperfect SIC. This is more in line with an actual situation (3) In the resource optimization method provided in the present disclosure, the non-convex optimization problem is constructed based on the user data transmission rates and the MSE of the aggregation model to jointly design the user transmit power and the reception strategy of the base station. The problem is solved through the SCA method such that the sum rate can be effectively maximized and the MSE can be effectively minimized.

BRIEF DESCRIPTION OF THE DRAWINGS

To describe the technical solutions in embodiments of the present application or in the prior art more clearly; the following briefly describes the accompanying drawings required for describing the embodiments. Apparently, the accompanying drawings in the following description show merely some embodiments of the present disclosure, and persons of ordinary skill in the art may still derive other accompanying drawings from these accompanying drawings.

DETAILED DESCRIPTION OF THE EMBODIMENTS

Success of FL relies on abundant computing resources of local users. However, this is impractical for many hardware-constrained IoT devices, such as low-end sensors with small amounts of computing resources. To resolve the foregoing problem, the present disclosure proposes a wireless FL framework such that users with limited computing resources and users with sufficient computing resources cooperatively train a global model. In the framework, the users with sufficient computing resources upload locally trained model parameters to a base station, and the users with limited computing resources only need to send training data to the base station. The base station performs data training and model aggregation to obtain the global model. In addition, to improve a data transmission rate and reduce an aggregation error of FL, the present disclosure constructs a non-convex optimization problem to jointly design user transmit power and a reception strategy of the base station, and solves the problem through an SCA method.

To better understand the technical solutions, the foregoing describes in detail a method in the present disclosure with reference to the accompanying drawings.

Figure 1:
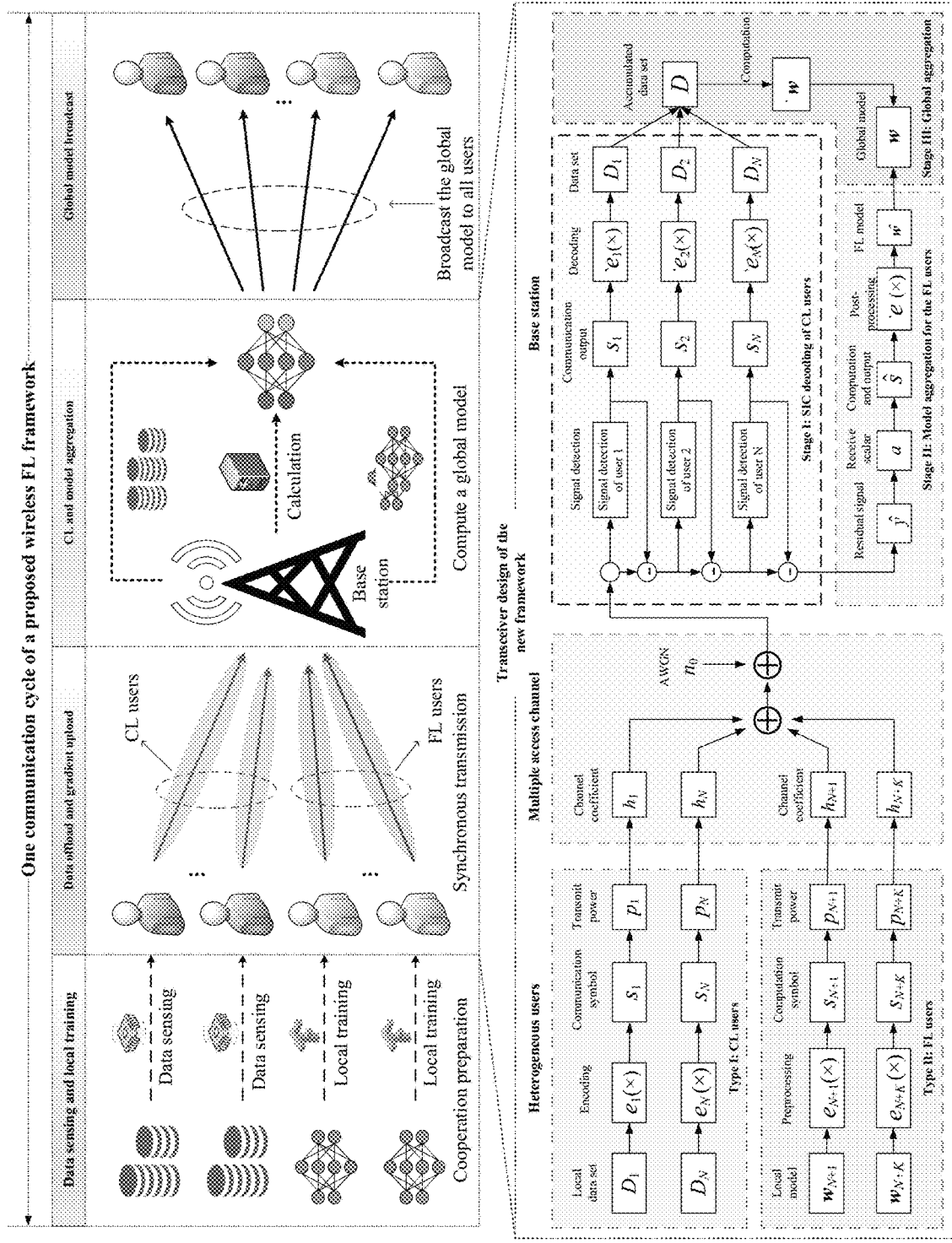
FIG. 1 is a structural diagram of a wireless FL framework and a transceiver according to an embodiment of the present disclosure.

Referring to FIG. 1, this embodiment includes the following steps:

S1: A wireless FL framework is proposed such that users with limited computing resources and users with sufficient computing resources cooperatively train a global model. In the framework, the users with sufficient computing resources upload trained model parameters to a base station, and the users with limited computing resources only need to send training data to the base station.

As shown in FIG. 1, in the framework, it is considered that there are N users with limited computing resources and K users with sufficient computing resources, and the base station serves as an FL server and is configured to compute the global model. The users with limited computing resources cannot meet a requirement of local data training due to limited computing power and can only send the training data to the base station for CL to participate in FL, which are also referred to as CL users and are represented as a set $N \triangleq \{1, 2, \ldots, N\}$. The users with sufficient computing resources can obtain local models from local training data and upload local model parameters to the base station without sending training data, which are also referred to as FL users and are represented as a set $K \triangleq \{N+1, N+2, \ldots, N+K\}$.

S2. CL is performed by the base station on accumulated data to obtain a CL model, and weighted summation is performed on the CL model and the received aggregation model based on a data amount to obtain the global model. It is assumed that there are T FL cycles in total, which are represented as a set $T = \{1, 2, \ldots, T\}$. In the $t^{th}$ cycle, the training data of the $n^{th}$ CL user is denoted as $D_n^{(t)}$, the local model of the $k^{th}$ FL user is denoted as $w_k^{(t)}$, and a stochastic gradient descent method is used for training. In this case, local model update by the user, centralized update by the base station, and global model aggregation are expressed as follows:

Local model update: $w_k^{(t+1)} = \tilde{w}^{(t)} - \eta g_k^{(t)}$, $\nabla F_k(\tilde{w}^{(t)}; D_k^{(t)})$, $\forall k$.

Centralized update by the base station: $\overline{w}_k^{(t+1)} = \tilde{w}^{(t)} - \eta \overline{g}^{(t)}$, $\overline{g}^{(t)} = \nabla F(\tilde{w}^{(t)}; D^{(t)})$.

Global model aggregation:

$$\tilde{w}^{(t+1)} = \frac{|D^{(t)}| \overline{w}^{(t+1)} + \sum_{k=N+1}^{N+K} |D_k^{(t)}| w_k^{(t+1)}}{|D^{(t)}| + \sum_{k=N+1}^{N+K} |D_k^{(t)}|}.$$

$\eta$ is a learning rate of the stochastic gradient descent method. $D^{(t)} = \sum_{t=1}^{t} \sum_{n=1}^{N} D_n^{(t)}$ is a training data set accumulated at the base station in t cycles. $F_k(\cdot)$ and $g_k^{(t)}$ are respectively a local loss function and a gradient of the $k^{th}$ FL user. $F(\cdot)$ and $\overline{g}^{(t)}$ are respectively a loss function and a gradient of the CL at the base station. $\tilde{w}_k^{(t+1)}$ is the global model aggregated at the base station.

S3: A training task and the global model are initialized by the base station, and the global model is sent to all users.

S4: The local models are updated by the users with sufficient computing resources based on the local training data After receiving the global model, the user with sufficient computing resources, namely, the FL user, computes a local loss function and a gradient based on the local training data. The loss function may be an MSE loss function or a cross-entropy loss function. This depends on the specific learning task. Then, the FL user updates the local model through the local model update formula in S2.

S5: A same frequency band is used by the users with sufficient computing resources and the users with limited resources to respectively upload the local models and send the training data simultaneously. A received signal is detected by the base station through imperfect SIC, and the training data and the aggregation model are separated.

Considering a contradiction between limited bandwidth and a large quantity of users in actual IoT, to save communication bandwidth and reduce delay, all users use the same timeslot and frequency band to upload the local models or send the training data in the present disclosure. Before the user uploads the local model or sends the training data, a local training data set $\{D_n\}$ of the CL users is normalized into a communication symbol set $\{s_n\}$ and the local models $\{w_k\}$ of the FL users are normalized into a computation symbol set $\{s_k\}$. A superimposed signal received by the base station is as follows:

$$y = \underbrace{\sum_{n=1}^{N} h_n \sqrt{p_n} s_n}_{CL\ users} + \underbrace{\sum_{k=N+1}^{N+K} h_k \sqrt{p_k} s_k}_{FL\ users} + \underbrace{n_0}_{Noise}$$

$h_n(h_k)$ is a channel coefficient from the $n^{th}$ ($k_{th}$) user to the base station, $p_n(p_k)$ is transmit power of the $n^{th}$ ($k^{th}$) user and falls within an interval $[0, P_{max}]$, and $n_0 \sim CN(0, \sigma^2)$ is additive noise in a channel. After receiving the superimposed signal, the base station detects the signal through imperfect SIC due to a decoding error, and separates the training data and the aggregation model. User transmit power is adjusted such that SIC constraints of different users satisfy:

$$|h_1\sqrt{p_1}| \geq |h_2\sqrt{p_2}| \geq \ldots \geq |h_N\sqrt{p_N}| \geq |h_k\sqrt{p_k}|, \forall k$$

After receiving the superimposed signal y, the base station detects the signals $\{s_n\}$ of all CL users in an order of 1, 2, ..., N. After the signals of all CL users are detected, a residual signal is as follows:

$$\hat{y} = \sqrt{\varpi}\sum_{n=1}^{N} h_n \sqrt{p_n} s_n + \sum_{k=N+1}^{N+K} h_k \sqrt{p_k} s_k + n_0$$

$\overline{\omega}$ is an interference coefficient of the residual signal, $\overline{\omega}=0$ corresponds to perfect SIC, and $\overline{\omega}=1$ corresponds to no SIC. To obtain an average FL model, the base station obtains an estimated value $\hat{s}=a\hat{y}/K$ of the aggregation model from the residual signal $\hat{y}$ by using a receiving factor a, and decode the signals $\{s_n\}$ and $\hat{s}$ through post-processing such as denormalization into the training data set of all CL users and the aggregation model.

S6: Data transmission rates of all users with limited computing resources and an MSE of the aggregation model of all users with sufficient computing resources are obtained. The signals of all CL users are detected in the order of 1, 2, ..., N through imperfect SIC based on the expression of the superimposed signal received by the base station in S5. The data transmission rate of the $n^{th}$ CL user is as follows:

$$R_n = \log_2\left(1 + \frac{|h_n|^2 p_n}{\varpi\sum_{i=1}^{n-1}|h_i|^2 p_i + \sum_{j=n+1}^{N+K}|h_j|^2 p_j + \sigma^2}\right), \forall n$$

$\overline{\omega}$ is an interference coefficient of the residual signal, $\overline{\omega}=0$ corresponds to perfect SIC, and $\overline{\omega}=1$ corresponds to no SIC. A sum (sum rate) of the data transmission rates of all CL users is $R_{sum}=\sum_{n=1}^{N} R_n$.

It is assumed that an aggregation model obtained by the base station is ideally $$s = \sum_{k=N+1}^{N+K} s_k/K.$$

The actual aggregation model obtained in S5 is $\hat{s}=a\hat{y}/K$. An aggregation error is measured by the MSE. The MSE is expressed as follows:

$$MSE = \frac{1}{K^2}\left(\vartheta_{CL} + \sum_{k=N+1}^{N+K} |ah_k\sqrt{p_k} - 1|^2 + |a|^2\sigma^2\right)$$

$$\vartheta_{CL} = \varpi\sum_{n=1}^{N} |ah_n\sqrt{p_n}|^2$$

is the interference of the signals of the CL users.

S7: A non-convex optimization problem is constructed based on the data transmission rates and the MSE of the aggregation model. The communication-centric CL user hopes that the data transmission rate can be maximized, and the computing-centric FL user hopes that the MSE of the aggregation model can be minimized. To meet the requirements of both types of users, the present disclosure jointly designs user transmit power and a reception strategy of the base station. The optimization problem is constructed as follows:

$$\max_{p,a} \quad R_{sum} - \lambda MSE$$
$$\text{s.t.} \quad R_n \geq R_{min}, \forall n$$
$$p_n, p_k \in [0, P_{max}], \forall n, k$$
$$MSE \leq \delta_0,$$
$$|h_1\sqrt{p_1}| \geq |h_2\sqrt{p_2}| \geq \ldots \geq |h_N\sqrt{p_N}| \geq |h_k\sqrt{p_k}|, \forall k$$

$p=[p_1, p_2, \ldots, p_N, p_{n+1}, \ldots, p_{N+K}]$ is the transmit power, $R_{min}$ is a minimum data transmission rate required by the CL user. $P_{max}$ is maximum transmit power of all users. $\dot{q}_0$ is a maximum aggregation model error that the FL users can tolerate. $\lambda$ is a constant used to strike a balance between the sum rate and the MSE. Because the optimization variables p, a are coupled to each other in the objective function and the constraints, the foregoing optimization problem is a non-convex optimization problem, and it is difficult to obtain an optimal solution.

S8: The non-convex optimization problem in S7 is transformed and solved through an SCA method. In the present disclosure, to solve the non-convex optimization problem constructed in S7, auxiliary variables $\gamma_n=2^{R_n}-1$, $\forall n$, and $b_i=a\sqrt{p_i}$, $\forall i \in N \cup K$ are introduced. The data transmission rate $R_n$ can be rewritten as $R_n=\log_2(1+\gamma_n)$. The MSE can be rewritten as follows:

$$MSE = \frac{1}{K^2}\left(\varpi\sum_{n=1}^{N}h_n^2 b_n^2 + \sum_{k=N+1}^{N+K}(h_k b_k - 1)^2 + a^2\sigma^2\right)$$

Therefore, the non-convex optimization problem in S7 is transformed into the following optimization problem:

$$\max_{p,a,\gamma,b} \sum_{n=1}^{N}\log_2(1+\gamma_n) - \lambda MSE$$

s.t. $h_1^2 p_1 \geq h_2^2 p_2 \geq \ldots h_N^2 p_N \geq h_k^2 p_k$, $\forall k \in K$ $\log_2(1+\gamma_n) \geq R_{min}$, $\forall n \in N$ $\dfrac{h_n^2 p_n}{\psi_n + \sigma^2} \geq \gamma_n$, $\forall n \in N$ $a\sqrt{p_i} \geq b_i$, $\forall i \in N \cup K$ $MSE \leq ?_0$, $p_n, p_k \in [0, P_{max}]$, $\forall n, k$ $\gamma = [\gamma_1, \gamma_2, \ldots, \gamma_N]$ and $b = [b_1, b_2, \ldots, b_N, b_{N+1}, b_{N+2}, \ldots, b_{N+K}]$ are introduced auxiliary vectors and are used as optimization variables.

$$\psi_n = \varpi\sum_{i=1}^{n-1}h_i^2 p_i + \sum_{j=n+1}^{N+K}h_j^2 p_j$$

is the interference of the signal of the $n^{th}$ CL user. In this case, $R_n$ is a concave function with respect to $\{\gamma_n\}$, and MSE is a convex function with respect to a and $\{b_i\}$. Therefore, the objective function of the foregoing optimization problem is a concave function with respect to a, $\{b_i\}$, and $\{\gamma_i\}$. It can be learned that in the constraints of the foregoing optimization problem, except that $$\frac{h_n^2 p_n}{\psi_n + \sigma^2} \geq \gamma_n,$$

$\forall n \in N$ and $a\sqrt{p_i} \geq b_i$, $\forall i \in N \cup K$ are non-convex, the other constraints are convex. The following transforms the two non-convex constraints into convex constraints through CUB and SCA methods.

To solve the non-convex constraint $$\frac{h_n^2 p_n}{\psi_n + \sigma^2} \geq \gamma_n,$$

$\forall n \in N$, it is equivalently transformed into the following expression:

$$h_n^2 p_n \geq \varpi\sum_{i=1}^{n-1}h_i^2 p_i \gamma_n + \sum_{j=n+1}^{N+K}h_j^2 p_j \gamma_n + \sigma^2 \gamma_n$$

It can be learned that the product terms $p_i\gamma_n$ and $p_j\gamma_n$ in the foregoing expression are non-convex. To solve them, the present disclosure lets $f(p_i\gamma_n)=p_i\gamma_n$. A CUB of $f(p_i\gamma_n)$ is $$g(p_i, \gamma_n, \tau_{in}) = \frac{\tau_{in}}{2}p_i^2 + \frac{1}{2\tau_{in}}\gamma_n^2.$$

$\tau_{in}$ is a CUB coefficient. It can be easily proved that when $\tau_{in}=\gamma_n/p_i$, $f(p_i\gamma_n) \leq g(p_i, \gamma_n, \tau_{in})$ can be taken as equal. Similarly, let $f(p_j, \gamma_n)=p_j \cdot \gamma_n$. The CUB of $f(p_j, \gamma_n)$ is $$g(p_j, \gamma_n, \tau_{jn}) = \frac{\tau_{jn}}{2}p_j^2 + \frac{1}{2\tau_{jn}}\gamma_n^2.$$

After the CUB is replaced by using $p_i$, $\gamma_n$ and $p_j$, $\gamma_n$, the non-convex constraint $$\frac{h_n^2 p_n}{\psi_n + \sigma^2} \geq \gamma_n, \forall n \in N$$

is transformed into the following convex constraint:

$$h_n^2 p_n \geq \varpi\sum_{i=1}^{n-1}h_i^2\left(\frac{\tau_{in}}{2}p_i^2 + \frac{1}{2\tau_{in}}\gamma_n^2\right) + \sum_{j=n+1}^{N+K}h_j^2\left(\frac{\tau_{jn}}{2}p_j^2 + \frac{1}{2\tau_{jn}}\gamma_n^2\right) + \sigma^2\gamma_n$$

In the foregoing convex constraint, the CUB coefficient $\tau_{in}$ is updated to $\tau_{in}^{(\ell+1)} = \gamma_n^{(\ell)}/p_i^{(\ell)}$, $\gamma_n^{(\ell)}$ and $p_i^{(\ell)}$ are solutions of the optimization problem in a $\ell^{th}$ iteration. Similarly, the CUB coefficient $\tau_{jn}$ is updated to $\tau_{jn}^{(\ell+1)} = \gamma_n^{(\ell)}/p_j^{(\ell)}$.

To solve the non-convex constraint $a\sqrt{p_i} \geq b_i$, $\forall i \in N \cup K$, when $p_i \neq 0$, it is rewritten as follows:

$$a \geq \frac{b_i}{\sqrt{p_i}}, \forall i \Rightarrow a^2 \geq \frac{b_i^2}{p_i}, \forall i$$

Non-convexity of the foregoing expression originates from the term $a^2$ on the left side of the inequality. The present disclosure uses a first-order Taylor expansion of $a^2$ at a point $p_j^{(\ell)}$ for replacement such that the non-convex constraint $a\sqrt{p_i} \geq b_i$, $\forall i \in N \cup K$ is transformed into the following convex constraint:

$$(a^{(\ell)})^2 + 2a^{(\ell)}(a - a^{(\ell)}) \geq b_i^2/p_i, \forall i$$

Based on the foregoing approximation, the non-convex optimization problem in S7 can be transformed into the following convex optimization problem:

$$\max_{p,a,\gamma,b} \sum_{n=1}^{N} \log_2(1+\gamma_n) - \lambda MSE$$

s.t. $h_1^2 p_1 \geq h_2^2 p_2 \geq \ldots h_N^2 p_N \geq h_k^2 p_k, \forall k \in K$ $\log_2(1+\gamma_n) \geq R_{min}, \forall n \in N$ $MSE \leq ?_0,$ $p_n, p_k \in [0, P_{max}], \forall n, k$ $h_n^2 p_n \geq \varpi \sum_{i=1}^{n-1} h_i^2 \left( \frac{\tau_{in}}{2} p_i^2 + \frac{1}{2\tau_{in}} \gamma_n^2 \right) + \sum_{j=n+1}^{N+K} h_j^2 \left( \frac{\tau_{jn}}{2} p_j^2 + \frac{1}{2\tau_{jn}} \gamma_n^2 \right) + \sigma^2 \gamma_n,$ $(a^{(\ell)})^2 + 2a^{(\ell)}(a - a^{(\ell)}) \geq b_i^2 / p_i, \forall i$ The foregoing convex optimization problem can be solved through a mathematical toolkit CVX to obtain an optimal solution.

Figure 2:
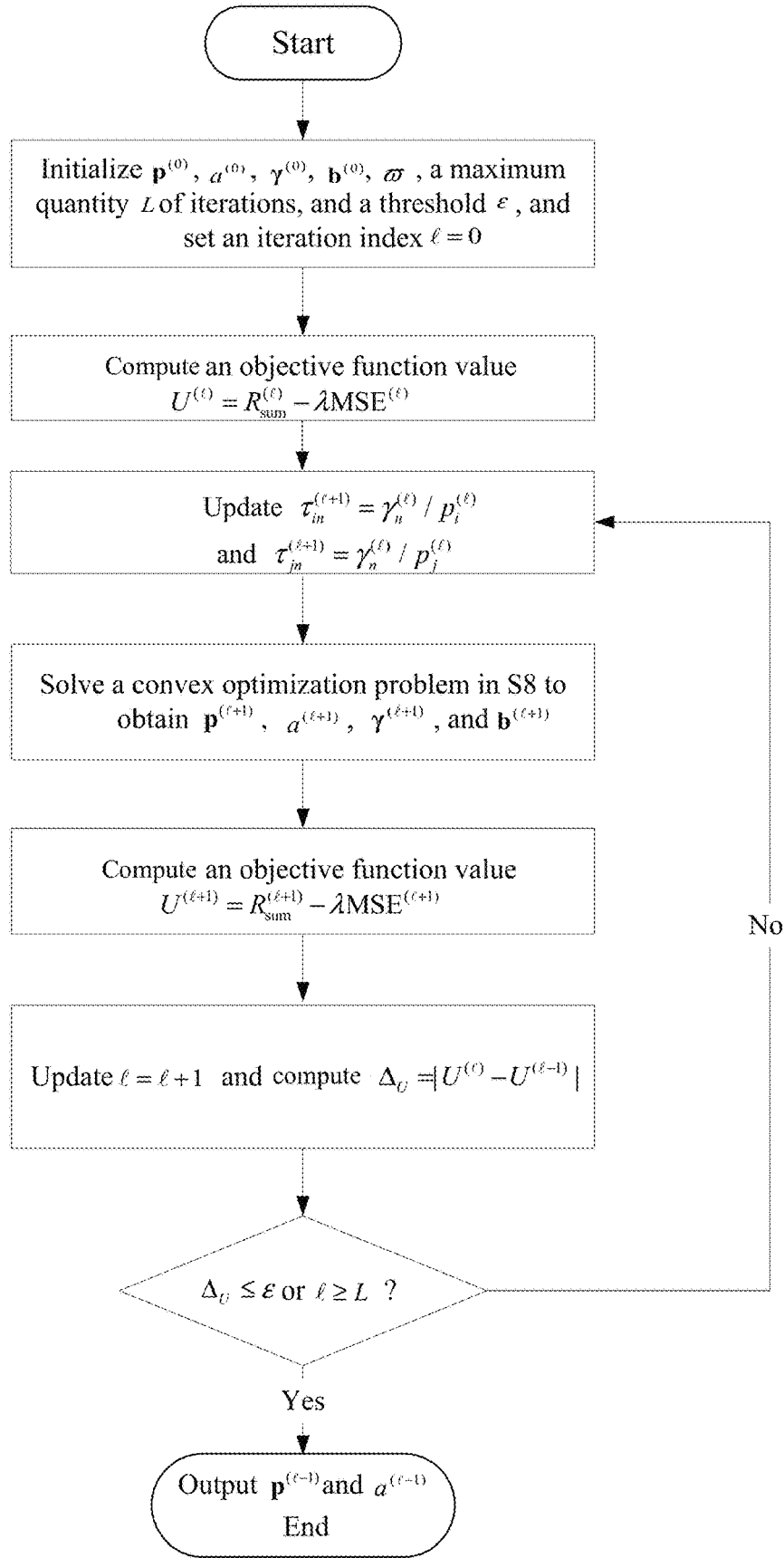
FIG. 2 is an algorithm flowchart of a resource optimization method for a wireless FL framework according to an embodiment of the present disclosure.

As shown in FIG. 2, solving the non-convex optimization problem in S7 includes the following steps:

S8.1: $p^{(0)}$, $a^{(0)}$, $\gamma^{(0)}$, $b^{(0)}$, $\varpi$, a maximum quantity L of iterations, and a threshold ε are initialized, and an iteration index $\ell = 0$ is set.

S8.2: An objective function value $U^{(\ell-1)} = R_{sum}^{(\ell)} - \lambda MSE^{(\ell)}$ is computed.

S8.3: Given $p^{(\ell)}$, $a^{(\ell)}$, $\gamma^{(\ell)}$, and $b^{(\ell)}$, $\tau_{in}^{(\ell+1)}$ and $\tau_{jn}^{(\ell+1)}$ are updated by using $\tau_{in}^{(\ell+1)} = \gamma_n^{(\ell)} / p_i^{(\ell)}$ and $\tau_{jn}^{(\ell+1)} = \gamma_n^{(\ell)} / p_j^{(\ell)}$.

S8.4: Given $\tau_{in}^{(\ell+1)}$ and $\tau_{jn}^{(\ell+1)}$, the convex optimization problem is solved through the mathematical toolkit CVX to obtain $p^{(\ell+1)}$, $a^{(\ell+1)}$, $\gamma^{(\ell+1)}$, and $b^{(\ell+1)}$.

S8.5: An objective function value $U^{(\ell+1)} = R_{sum}^{(\ell+1)} - E^{(\ell+1)}$ is computed.

S8.6: $\ell = \ell + 1$ is updated and $\Delta_U = |U^{(\ell)} - U^{(\ell-1)}|$ is computed.

S8.7: S8.3 to S8.6 are repeated until $\Delta_U \leq \varepsilon$ or $\ell \geq L$ and user transmit power $p^{(\ell-1)}$ and a receiving factor $a^{(\ell-1)}$ are output.

Herein, the user transmit power has an upper bound and the MSE is non-negative. Therefore, the objective function of the optimization problem has an upper bound, and convergence of the foregoing iterative algorithm can be ensured.

S9: The same frequency band and the transmit power solved in S8 are used by the users to upload the local models or send the training data simultaneously. User data is detected by the base station through imperfect SIC and decoding is performed by using the reception strategy solved in S8 to obtain the aggregation model.

S10: CL is performed by the base station on the accumulated data to obtain the CL model, and weighted summation is performed on the CL model and the received aggregation model based on the data amount to obtain the global model.

S11: The global model is broadcast by the base station to all users, and S3 to S10 are repeated until a total cycle quantity requirement is met.

In summary, the wireless FL framework provided in the present disclosure can allow the users with limited computing resources and the users with sufficient computing resources to participate in FL together, and make full use of data of heterogeneous users to improve performance of a machine learning model. In the present disclosure, all users use the same frequency band to upload the models or send the data simultaneously such that spectrum resources can be effectively saved and communication delay can be reduced. The base station detects the signals through imperfect SIC. This is more in line with an actual situation. In addition, in the present disclosure, the non-convex optimization problem is constructed based on the user data transmission rates and the MSE of the aggregation model to jointly design the user transmit power and the reception strategy of the base station. The problem is solved through the SCA method such that the sum rate can be effectively maximized and the MSE can be effectively minimized.

The foregoing embodiments are used only to describe the technical solutions of the present disclosure, and are not intended to limit same. Although the present disclosure is described in detail with reference to the foregoing embodiments, those of ordinary skill in the art should understand that they can still modify the technical solutions described in the foregoing embodiments, or make equivalent substitutions to some technical features therein. These modifications or substitutions do not make the essence of the corresponding technical solutions depart from the spirit and scope of the technical solutions of the embodiments of the present disclosure.

What is claimed is:

1. A wireless federated learning (FL) framework, comprising:
    N centralized learning (CL) users with limited computing resources, wherein the CL users send training data to a base station for CL to participate in FL;
    K FL users with sufficient computing resources, wherein the FL users obtain local models through local training data, and upload local model parameters as an aggregation model to the base station; and
    the base station serving as an FL server and configured to compute a global model, wherein the base station performs CL on the training data accumulated by the CL users to obtain a CL model, and performs weighted summation on the CL model and the aggregation model based on a data amount to obtain the global model,
    wherein it is assumed that there are T FL cycles in total, which are represented as a set T={1, 2, . . . , T}; and in a $t^{th}$ FL cycle, a local model update formula of a $k^{th}$ FL user is as follows:

$w_k^{(t+1)} = \bar{w}^{(t)} - \eta g_k^{(t)}, g_k^{(t)} = \nabla F_k(\bar{w}^{(t)}; D_k^{(t)}), \forall k$ a centralized update formula of the base station is as follows:

$\bar{w}^{(t+1)} = \bar{w}^{(t)} - \eta \bar{g}^{(t)}, \bar{g}^{(t)} = \nabla F \bar{w}^{(t)}; D^{(t)})$ a global model aggregation formula is as follows:

$$\tilde{w}^{(t+1)} = \frac{|D(t)|\bar{w}^{(t+1)} + \sum_{k=N+1}^{N+K}|D_k^{(t)}|w_k^{(t+1)}}{|D^{(t)}| + \sum_{k=N+1}^{N+K}|D_k^{(t)}|}$$

wherein η is a learning rate of a stochastic gradient descent method, $D^{(t)} = \Sigma_{i=1}^t \Sigma_{n=1}^N D_n^{(i)}$ is a training data set accumulated at the base station in t cycles, $F_k(\cdot)$ and $g_k^{(t)}$ are respectively a local loss function and a gradient of the $k^{th}$ FL user, $F(\cdot)$ and $\bar{g}^{(t)}$ are respectively a loss function and a gradient of the CL at the base station, and $\tilde{w}^{(t+1)}$ is the global model aggregated at the base station.

2. A resource optimization method for a wireless federated learning (FL) framework, the wireless federated learning (FL) framework including N centralized learning (CL) users with limited computing resources, wherein the CL users send training data to a base station for CL to participate in FL, and K FL users with sufficient computing resources, wherein the FL users obtain local models through local training data and upload local model parameters as an aggregation model to the base station, the base station serving as an FL server and configured to compute a global model, wherein the base station performs CL on the training data accumulated by the CL users to obtain a CL model and performs weighted summation on the CL model and the aggregation model based on a data amount to obtain the global model, the resource optimization method comprising the following steps:

S1: initializing, by the base station, a training task and the global model, and sending the global model to all users;

S2: after receiving the global model, computing, by the FL user, a local loss function and a gradient based on the local training data, and updating the local model;

S3: using, by the FL users and the CL users, a same frequency band to respectively upload the local models and send the training data simultaneously; and detecting, by the base station, a received signal through imperfect successive interference cancellation (SIC), and separating the training data and the aggregation model;

S4: obtaining data transmission rates of all CL users and a mean square error (MSE) of the aggregation model of all FL users, and detecting signals of all CL users in an order of 1, 2, . . . , N through imperfect SIC;

S5: constructing a non-convex optimization problem based on the data transmission rates and the MSE of the aggregation model; and S6: transforming and solving the non-convex optimization problem in S5 through a successive convex approximation (SCA) method, and outputting user transmit power and a reception strategy.

3. The resource optimization method for the wireless FL framework according to claim 2, wherein the local loss function in S2 is an MSE loss function or a cross-entropy loss function.

4. The resource optimization method for the wireless FL framework according to claim 2, wherein S3 comprises:

before the user uploads the local model or sends the training data, normalizing a local training data set $\{D_n\}$ of the CL users into a communication symbol set $\{s_n\}$ and the local models $\{w_k\}$ of the FL users into a computation symbol set $\{s_k\}$, wherein a superimposed signal received by the base station is as follows:

$$y = \underbrace{\sum_{n=1}^{N} h_n\sqrt{p_n}\,s_n}_{CL\;users} + \underbrace{\sum_{k=N+1}^{N+K} h_k\sqrt{p_k}\,s_k}_{FL\;users} + \underbrace{n_0}_{Noise}$$

wherein $h_n(h_k)$ is a channel coefficient from an $n^{th}$ ($k^{th}$) user to the base station, $p_n(p_k)$ is transmit power of the $n^{th}$ ($k^{th}$) user and falls within an interval $[0, P_{max}]$, and $n_0 \sim CN(0, \sigma^2)$ is additive noise in a channel;

adjusting the user transmit power such that SIC constraints of different users satisfy:

$$|h_1\sqrt{p_1}| \geq |h_2\sqrt{p_2}| \geq \ldots \geq |h_N\sqrt{p_N}| \geq |h_k\sqrt{p_k}|, \forall k$$

after receiving the superimposed signal y, the signals $\{s_n\}$ of all CL users are detected by the base station in the order of 1, 2, . . . , N, wherein after the signals of all CL users are detected, a residual signal is as follows:

$$\hat{y} = \sqrt{\bar{\omega}}\sum_{n=1}^{N} h_n\sqrt{p_n}\,s_n + \sum_{k=N+1}^{N+K} h_k\sqrt{p_k}\,s_k + n_0$$

wherein $\bar{\omega}$ is an interference coefficient of the residual signal, $\bar{\omega}=0$ corresponds to perfect SIC, and $\bar{\omega}=1$ corresponds to no SIC; and obtaining, by the base station, an estimated value $\hat{s}=a\hat{y}/K$ of the aggregation model from the residual signal $\hat{y}$ by using a receiving factor a, and decoding the signals $\{s_n\}$ and $\hat{s}$ into the training data set of all CL users and the aggregation model through denormalization post-processing, to obtain an average FL model.

5. The resource optimization method for the wireless FL framework according to claim 4, wherein in S4, a formula of the data transmission rate of the $n^{th}$ CL user is as follows:

$$R_n = \log_2\left(1 + \frac{|h_n|^2 p_n}{\bar{\omega}\sum_{i=1}^{n-1}|h_i|^2 p_i + \sum_{j=n+1}^{N+K}|h_j|^2 p_j + \sigma^2}\right), \forall n$$

wherein $\bar{\omega}$ is the interference coefficient of the residual signal, $\bar{\omega}=0$ corresponds to perfect SIC, $\bar{\omega}=1$ corresponds to no SIC, a sum of the data transmission rates of all CL users is $R_{sum}=\Sigma_{n=1}^N R_n$, and $\sigma^2$ is additive noise power in the channel.

6. The resource optimization method for the wireless FL framework according to claim 5, wherein in S4, a formula of the MSE of the aggregation model is as follows:

$$MSE = \frac{1}{K^2}\left(\vartheta_{CL} + \sum_{k=N+1}^{N+K}|ah_k\sqrt{p_k} - 1|^2 + |a|^2\sigma^2\right)$$

wherein $\vartheta_{CL}=\bar{\omega}\,\Sigma_{n=1}^N |ah_n\sqrt{p_n}|^2$ is interference of the signals of the CL users.

7. The resource optimization method for the wireless FL framework according to claim 5, wherein in S5, the non-convex optimization problem is constructed as follows:

$$\max_{p,a} R_{sum} - \lambda MSE$$

-continued s.t. $R_n \geq R_{min}, \forall n$ $p_n, p_k \in [0, P_{max}], \forall n, k$ $MSE \leq \delta_0,$ $|h_1\sqrt{p_1}| \geq |h_2\sqrt{p_2}| \geq \ldots \geq |h_N\sqrt{p_N}| \geq |h_k\sqrt{p_k}|, \forall k$ wherein $p=[p_1, p_2, \ldots, p_N, p_{N+1}, \ldots, p_{N+K}]$ is the transmit power, $R_{min}$ is a minimum data transmission rate required by the CL user, $P_{max}$ is maximum transmit power of all users, $\delta_0$, is a maximum aggregation model error that the FL users can tolerate, and $\lambda$ is a constant used to strike a balance between the sum rate $R_{sum}$ and the MSE.

8. The resource optimization method for the wireless FL framework according to claim 2, wherein a convex optimization problem obtained through transformation in S6 is as follows:

$$\max_{p,a,\gamma,b} \sum_{n=1}^{N} \log_2(1+\gamma_n) - \lambda MSE$$

$$\text{s.t. } h_1^2 p_1 \geq h_2^2 p_2 \geq \ldots h_N^2 p_N \geq h_k^2 p_k, \forall k \in K$$

$$\log_2(1+\gamma_n) \geq R_{min}, \forall n \in N$$

$$MSE \leq ?_0,$$

$$p_n, p_k \in [0, P_{max}], \forall n, k$$

$$h_n^2 p_n \geq$$

$$\varpi \sum_{i=1}^{n-1} h_i^2 \left(\frac{\tau_{in}}{2} p_i^2 + \frac{1}{2\tau_{in}} \gamma_n^2\right) + \sum_{j=n+1}^{N+K} h_j^2 \left(\frac{\tau_{jn}}{2} p_j^2 + \frac{1}{2\tau_{jn}} \gamma_n^2\right) + \sigma^2 \gamma_n,$$

$$(a^{(l)})^2 + 2a^{(l)}(a-a^{(l)}) \geq b_i^2 / p_i, \forall i$$

wherein $\gamma=[\gamma_1, \gamma_2, \ldots, \gamma_N]$ and $b=[b_1, b_2, \ldots, b_N, b_{N+1}, b_{N+2}, \ldots, b_{N+K}]$ are introduced auxiliary vectors, $\gamma_n=2^{R_n}-1$, $\forall n$, $b_i=a\sqrt{p_i}$, $\forall i \in N \cup K$, and $\tau_{in}$ and $\tau_{jn}$ are convex upper bound (CUB) coefficients.

9. The resource optimization method for the wireless FL framework according to claim 8, wherein solving the convex optimization problem in S6 comprises:
S6.1: initializing $p^{(0)}$, $a^{(0)}$, $\gamma^{(0)}$, $b^{(0)}$, $\overline{\omega}$, a maximum quantity L of iterations, and a threshold $\varepsilon$, and setting an iteration index l=0;
S6.2: computing an objective function value $U^{(l)}=R_{sum}^{(l)}-\lambda MSE^{(l)}$;
S6.3: given $p^{(l)}$, $a^{(l)}$, $\gamma^{(l)}$, and $b^{(l)}$, updating $\tau_{in}^{(l+1)}$ and $\tau_{jn}^{(l+1)}$ by using $\tau_{in}^{(l+1)}=\gamma_n^{(l)}/p^{(l)}$ and $\tau_{jn}^{(l+1)}=\gamma_n^{(l)}/p_j^{(l)}$;
S6.4: given $\tau_{in}^{(l+1)}$ and $\tau_{jn}^{(l+1)}$, solving the convex optimization problem through a mathematical toolkit CVX to obtain $p^{(l+1)}$, $a^{(l+1)}$, $\gamma^{(l+1)}$, and $b^{(l+1)}$;
S6.5: computing an objective function value $U^{(l+1)}=R_{sum}^{(l+1)}-\lambda MSE^{(l+1)}$;
S6.6: updating l=l+1 and computing $\Delta_U=|U^{(l)}-U^{(l-1)}|$; and
S6.7: repeating S6.3 to S6.6 until $\Delta_U \leq \varepsilon$ or $l \geq L$ and outputting user transmit power $p^{(l-1)}$ and a receiving factor $a^{(l-1)}$.

10. A resource optimization method for the wireless FL framework according to claim 1, comprising the following steps:
S1: initializing, by the base station, a training task and the global model, and sending the global model to all users;
S2: after receiving the global model, computing, by the FL user, a local loss function and a gradient based on the local training data, and updating the local model;
S3: using, by the FL users and the CL users, a same frequency band to respectively upload the local models and send the training data simultaneously; and detecting, by the base station, a received signal through imperfect successive interference cancellation (SIC), and separating the training data and the aggregation model;
S4: obtaining data transmission rates of all CL users and a mean square error (MSE) of the aggregation model of all FL users, and detecting signals of all CL users in an order of 1, 2, . . . , N through imperfect SIC;
S5: constructing a non-convex optimization problem based on the data transmission rates and the MSE of the aggregation model; and
S6: transforming and solving the non-convex optimization problem in S5 through a successive convex approximation (SCA) method, and outputting user transmit power and a reception strategy.

11. The resource optimization method for the wireless FL framework according to claim 10, wherein the local loss function in S2 is an MSE loss function or a cross-entropy loss function.

12. The resource optimization method for the wireless FL framework according to claim 10, wherein S3 comprises:
before the user uploads the local model or sends the training data, normalizing a local training data set $\{D_n\}$ of the CL users into a communication symbol set $\{s_n\}$ and the local models $\{w_k\}$ of the FL users into a computation symbol set $\{s_k\}$, wherein a superimposed signal received by the base station is as follows:

$$y = \underbrace{\sum_{n=1}^{N} h_n\sqrt{p_n}\, s_n}_{CL\text{ users}} + \underbrace{\sum_{k=N+1}^{N+K} h_k\sqrt{p_k}\, s_k}_{FL\text{ users}} + \underbrace{n_0}_{Noise}$$

wherein $h_n(h_k)$ is a channel coefficient from an $n^{th}$ ($k^{th}$) user to the base station, $p_n(p_k)$ is transmit power of the $n^{th}$ ($k^{th}$) user and falls within an interval [0, $P_{max}$], and $n_0 \sim CN(0, \sigma^2)$ is additive noise in a channel;
adjusting the user transmit power such that SIC constraints of different users satisfy:

$$|h_1\sqrt{p_1}| \geq |h_2\sqrt{p_2}| \geq \ldots \geq |h_N\sqrt{p_N}| \geq |h_k\sqrt{p_k}|, \forall k$$

after receiving the superimposed signal y, the signals $\{s_n\}$ of all CL users are detected by the base station in the order of 1, 2, . . . , N, wherein after the signals of all CL users are detected, a residual signal is as follows:

$$\hat{y} = \sqrt{\varpi} \sum_{n=1}^{N} h_n\sqrt{p_n}\, s_n + \sum_{k=N+1}^{N+K} h_k\sqrt{p_k}\, s_k + n_0$$

wherein $\overline{\omega}$ is an interference coefficient of the residual signal, $\overline{\omega}=0$ corresponds to perfect SIC, and $\overline{\omega}=1$ corresponds to no SIC; and
obtaining, by the base station, an estimated value $\hat{s}=a\hat{y}/K$ of the aggregation model from the residual signal $\hat{y}$ by using a receiving factor a, and decoding the signals $\{s_n\}$ and $\hat{s}$ into the training data set of all CL users and the aggregation model through denormalization post-processing, to obtain an average FL model.

13. The resource optimization method for the wireless FL framework according to claim 12, wherein in S4, a formula of the data transmission rate of the $n^{th}$ CL user is as follows:

$$R_n = \log_2\left(1 + \frac{|h_n|^2 p_n}{\varpi\sum_{i=1}^{n-1}|h_i|^2 p_i + \sum_{j=n+1}^{N+K}|h_j|^2 p_j + \sigma^2}\right), \forall n$$

wherein $\overline{\omega}$ is the interference coefficient of the residual signal, $\overline{\omega}=0$ corresponds to perfect SIC, $\overline{\omega}=1$ corresponds to no SIC, a sum of the data transmission rates of all CL users is $R_{sum}=\Sigma_{n=1}^{N}R_n$, and $\sigma^2$ is additive noise power in the channel.

14. The resource optimization method for the wireless FL framework according to claim 13, wherein in S4, a formula of the MSE of the aggregation model is as follows:

$$MSE = \frac{1}{K^2}\left(\vartheta_{CL} + \sum_{k=N+1}^{N+K}|ah_k\sqrt{p_k} - 1|^2 + |a|^2\sigma^2\right)$$

wherein $$\vartheta_{CL} = \varpi\sum_{n=1}^{N}|ah_n\sqrt{p_n}|^2$$

is interference of the signals of the CL users.

15. The resource optimization method for the wireless FL framework according to claim 13, wherein in S5, the non-convex optimization problem is constructed as follows:

$$\max_{p,a} R_{sum} - \lambda MSE$$
$$\text{s.t.} R_n \geq R_{min}, \forall n$$
$$p_n, p_k \in [0, P_{max}], \forall n, k$$
$$MSE \leq \delta_0,$$
$$|h_1\sqrt{p_1}| \geq |h_2\sqrt{p_2}| \geq \ldots \geq |h_N\sqrt{p_N}| \geq |h_k\sqrt{p_k}|, \forall k$$

wherein $p=[p_1, p_2, \ldots, p_N, p_{N+1}, \ldots, p_{N+K}]$ is the transmit power, $R_{min}$ is a minimum data transmission rate required by the CL user, $P_{max}$ is maximum transmit power of all users, $\delta_0$, is a maximum aggregation model error that the FL users can tolerate, and $\lambda$ is a constant used to strike a balance between the sum rate $R_{sum}$ and the MSE.

16. The resource optimization method for the wireless FL framework according to claim 10, wherein a convex optimization problem obtained through transformation in S6 is as follows:

$$\max_{p,a,\gamma,b}\sum_{n=1}^{N}\log_2(1+\gamma_n) - \lambda MSE$$
$$\text{s.t.} h_1^2 p_1 \geq h_2^2 p_2 \geq \ldots h_N^2 p_N \geq h_k^2 p_k, \forall k \in K$$
$$\log_2(1+\gamma_n) \geq R_{min}, \forall n \in N$$
$$MSE \leq \delta_0,$$
$$p_n, p_k \in [0, P_{max}], \forall n, k$$
$$h_n^2 p_n \geq$$
$$\varpi\sum_{i=1}^{n-1}h_i^2\left(\frac{\tau_{in}}{2}p_i^2 + \frac{1}{2\tau_{in}}\gamma_n^2\right) + \sum_{j=n+1}^{N+K}h_j^2\left(\frac{\tau_{jn}}{2}p_j^2 + \frac{1}{2\tau_{jn}}\gamma_n^2\right) + \sigma^2\gamma_n,$$
$$(a^{(l)})^2 + 2a^{(l)}(a-a^{(l)}) \geq b_i^2/p_i, \forall i$$

wherein $\gamma=[\gamma_1, \gamma_2, \ldots, \gamma_N]$ and $b=[b_1, b_2, \ldots, b_N, b_{N+1}, b_{N+2}, \ldots, b_{N+K}]$ are introduced auxiliary vectors, $\gamma_n = 2^{R_n}-1, \forall n, b_i = a\sqrt{p_i}, \forall i \in N \cup K$, and $\tau_{in}$ and $\tau_{jn}$ are convex upper bound (CUB) coefficients.

17. The resource optimization method for the wireless FL framework according to claim 16, wherein solving the convex optimization problem in S6 comprises:

S6.1: initializing $p^{(0)}$, $a^{(0)}$, $\gamma^{(0)}$, $b^{(0)}$, $\overline{\omega}$, a maximum quantity L of iterations, and a threshold $\varepsilon$, and setting an iteration index l=0;

S6.2: computing an objective function value $U^{(l)} = R_{sum}^{(l)} - \lambda MSE^{(l)}$;

S6.3: given $p^{(l)}$, $a^{(l)}$, $\gamma^{(l)}$, and $b^{(l)}$, updating $\tau_{in}^{(l+1)}$ and $\tau_{jn}^{(l+1)}$ by using $\tau_{in}^{(l+1)} = \gamma_n^{(l)}/p_i^{(l)}$ and $\tau_{jn}^{(l+1)} = \gamma_n^{(l)}/p_j^{(l)}$;

S6.4: given $\tau_{in}^{(l+1)}$ and $\tau_{jn}^{(l+1)}$, solving the convex optimization problem through a mathematical toolkit CVX to obtain $p^{(l+1)}$, $a^{(l+1)}$, $\gamma^{(l+1)}$, and $b^{(l+1)}$;

S6.5: computing an objective function value $U^{(l+1)} = R_{sum}^{(l+1)} - \lambda MSE^{(l+1)}$;

and S6.6: updating $l=l+1$ and computing $\Delta_U = |U^{(l)} - U^{(l-1)}|$; and S6.7: repeating S6.3 to S6.6 until $\Delta_U \leq \varepsilon$ or $l \geq L$ and outputting user transmit power $p^{(l-1)}$ and a receiving factor $a^{(l-1)}$.

* * * * *